United States Patent [19]

Spicer

[11] Patent Number: 5,157,714

[45] Date of Patent: Oct. 20, 1992

[54] METHOD FOR COLLECTING AND DISSEMINATING AVAILABLE-LOAD INFORMATION FOR THE TRUCKING INDUSTRY

[76] Inventor: James R. Spicer, 1036 Oakmont, Hamilton, Ohio 45013

[21] Appl. No.: 734,258

[22] Filed: Jul. 22, 1991

[51] Int. Cl.$^5$ .................... H04M 11/00; H04M 1/64; H04M 1/56

[52] U.S. Cl. .................................... 379/89; 379/88; 379/67; 379/97; 379/142

[58] Field of Search .................. 379/67, 89, 88, 97, 379/142

[56] References Cited

U.S. PATENT DOCUMENTS 4,625,081  11/1986  Lotito et al. ................... 379/88
4,757,267  7/1988  Riskin .......................... 379/97

FOREIGN PATENT DOCUMENTS 63-48943  3/1988  Japan ........................... 379/67

OTHER PUBLICATIONS (1) Octel Information Sheet (1 p.).

Primary Examiner—James L. Dwyer
Assistant Examiner—Fan Tsang
Attorney, Agent, or Firm—Wood, Herron & Evans

[57] ABSTRACT

A method for collecting and disseminating available load information for the trucking industry utilizes a telephone-accessible controller which enables providers of loads to record into memory voiced messages related to loads currently available for shipment by truck. Each message is stored in memory at an address which represents a telephone area code used in the geographical region where the load will originate. Each message may contain one or more entries, with each entry representing an available load and including at least a provider identification and a load destination. Solicitors contact the controller by telephone, select the area code/memory address for a geographical region where a load is needed, and then listen to a playback of all the recorded entries for available-loads originating from that geographical area code/memory address. Thereafter, the solicitor selects an available-load and contacts the provider of that load by separate telephone call. The provider may then call the controller to erase from the controller's memory the entry describing the available-load.

10 Claims, 4 Drawing Sheets

METHOD FOR COLLECTING AND DISSEMINATING AVAILABLE-LOAD INFORMATION FOR THE TRUCKING INDUSTRY

FIELD OF THE INVENTION

This invention relates to the trucking industry, and more particularly, to an improved method for collecting and disseminating available load information to dispatchers of companies and their drivers.

BACKGROUND OF THE INVENTION

For the greater part of the United States, transportation by truck over the federal and state highways represents the most economical method for hauling goods. To maintain optimum economic efficiency of hauling freight by truck, and to take full advantage of recent deregulation of the trucking industry within the United States, it is in the best interest of all those involved in the trucking industry to maximize use of readily available shipping capacity on a regular and up-to-date basis. One manner of achieving this goal is to assure that trucks haul a load both to and from a main destination. It is thus desirable to reduce, to the extent possible, the number of times in which a truck travels empty, either on a return trip from a main destination or enroute to picking up a load in another location. In short, there exists an ongoing need in the trucking industry to collect and disseminate available-load information in a continuous, efficient and up-to-date manner.

One current available-load information system utilizes the many truck stops found along our nation's highways. According to the system, a monitor displays available load information for the locality of the truck stop. A driver at the truck stop simply views the screen to learn of the available loads and the destinations for the available loads. He or she then calls the number of the shipper displayed on the screen to obtain more information from the shipper.

While this system has proved somewhat beneficial to truck drivers and shippers, it suffers from a number of practical disadvantages. Namely, limited availability and geographical restrictions reduce the overall effectiveness of this system. For instance, many large cities where goods originate do not have easy access to a truck stop with such a system. As a result, truck drivers are required to drive to the nearest truck stop which employs such a system to obtain the information displayed on the television screen, and then, in most cases, drive back to a manufacturing sector of the city to pick up a load to be shipped. The costs associated with shipping by truck correspond directly to the number of miles that a truck driver must drive. Because this available-load information system often requires extra driving, use of this system results in added costs.

Moreover, with this type of system it is difficult for a trucking company hauling a load from a first, origination city to a second, destination city to learn ahead of time about return loads available at the second city. To avoid returning to the origination city with an empty truck, the trucking company needs to know in advance what, if any, loads are available for hauling from the destination city back to the origination city. Because the above-described system relies upon a visual monitor fixed in one location, i.e., the truck stop, the available-load information is not readily obtainable outside of the immediate geographic area. Those not at the truck stop cannot take advantage of the system. Thus, dispatchers for trucking companies must make long distance telephone calls to various locations to find an available load which best suits their needs. Sometimes this method "ties up" available loads because a dispatcher will accept an available load, yet continue to attempt to obtain a better, i.e., more economical, load. If a better load is found, the first is cancelled. As a result, the first load may be unnecessarily delayed by the dispatcher if a better load is located.

In short, there exists a need for a more efficient, accurate and economical manner of collecting and disseminating available-load information within the trucking industry.

SUMMARY OF THE INVENTION

It is an object of this invention to provide the trucking industry with a more geographically accessible method for conveying available-load information on a regular basis.

It is still another object of the invention to provide the trucking industry with a more accurate and up-to-date method for conveying available-load information to those soliciting such information.

It is yet another object of the invention to provide a cost effective method for both collecting available-load information from providers of loads and disseminating this collected information to solicitors, i.e., dispatchers for truck companies and/or truck drivers.

To these ends, this invention contemplates a method which utilizes a controller interconnected to the conventional telephone system to allow load providers to call in and record available-load messages in memory. The messages are stored in memory at addresses which correspond to the geographical locations of origin of the loads, and the messages are accessible to solicitors by inputting the area codes used for these geographical locations. Each message may contain more than one entry, with the content of each message entry containing a load-provider identification, the type of truck needed, a final geographical destination and possibly additional important information. Thereafter, a solicitor places a telephone call to the controller, selects a telephone area code which corresponds to a geographical location of origin where a load will be needed and listens to a replay from memory of all of the available-load messages stored therein. When the solicitor hears a message about an available-load destined for his desired location, the solicitor calls the provider identified in the message. If a deal is made, the provider may then call the controller to erase from memory the message describing that particular available-load.

In this specification, the term "provider" is used to designate someone who has a load to be shipped, or a broker or agent representing someone with a load to be shipped. The term "solicitor" means a dispatcher for a truck company, a truck driver or any other individual wishing to obtain available-load or service information.

Because this system is interconnected with the conventional telephone system, both providers and solicitors have geographically unrestricted access to the system, thereby facilitating the collection and dissemination of information pertaining to available loads. Telephone access to this system from any touch tone telephone reduces the total time required for solicitors to find out about available loads because only one telephone call is required. In short, this method improves communication between providers and solicitors, and as a result, reduces the number of empty loads which are due to lack of information about available loads or accessible trucks. Thus, this method benefits providers, solicitors and also consumers, who ultimately must pay for goods shipped by truck. All of these groups also benefit because dispatchers learn about available loads by placing one telephone call, and no loads are unnecessarily delayed.

According to one preferred embodiment of the invention, a controller interconnected to the telephone system includes a programmable telephone answering machine with multiple memory addresses accessible by code to providers for storing and erasing available-load messages. Each message includes one or more entries for describing one or more available loads. Each entry preferably includes a shipper identification, a geographical destination for the load, the type of trailer and/or equipment required, total weight, rate of pay and other important information.

In operation, a provider calls a provider telephone number for the controller from a touch tone telephone, and the controller plays a prerecorded welcome message. The predetermined message instructs the provider to key into the telephone a password and a code. If the provider is familiar with the system, he may bypass the message by placing the call and entering the password and code immediately thereafter. Receipt of an authorized password permits access into the controller memory, but only to the one or more codes purchased by the provider. Each code represents paid-for space in memory relevant to a particular geographical region. Preferably, each code holds about one minute for messages. The controller automatically associates each provider-entered code to the geographical area code in which the provider wishes to advertise available loads. Within each three digit code, there may exist a plurality of purchased codes for storing messages, from one or more providers. Each provider may store and erase messages within multiple area codes by purchasing additional codes assigned to the various geographical region where he wishes to provide loads. There is only one provider for each code. The controller may further organize the provider codes according to specific cities within the respective area code.

Once a signal corresponding to the provider-entered area code is processed by the controller, the controller locates that code within memory and then transmits a verbal instruction to the provider to press one button to record a message or another button to erase a message. If "record" is selected, the depressed number generates a signal to activate the controller to record the subsequently spoken information related to one or more available loads. After recording is complete, the provider has an opportunity to listen to the recorded message. This may be done by depressing another pushbutton. If the message is okay as recorded, the pound key is depressed to terminate interaction with the controller and disconnect the call.

If "erase" is selected, the controller plays back the message from memory. During playback, pushing one button retains the entry while pushing a different button deletes the entry. Thus, the provider listens to at least some portion of all the entries within the message to determine whether to delete or retain. A slight delay must be used between each entry when recording so that, during playback, the controller may fast forward and locate the next recorded entry within the purchased minute for that area code. When the provider is finished, he presses the pound key to disconnect the controller and the telephone call.

Subsequently, a solicitor calls a solicitor-telephone number for the controller from a touch tone telephone. A prerecorded verbal welcome instructs the solicitor to enter an area code for a geographical area where a load is desired. After the solicitor enters the area code, the controller preferably requests that the solicitor enter another number to select a specific city in the selected area code. After a city is entered by depressing a button, the controller replays the messages from all of the codes stored in that portion of the area code/memory pertaining to the selected city.

When the solicitor hears an available-load entry which relates to an undesired destination, or which describes an incompatible load, he simply depresses the pound key on the telephone to fast forward the controller to the next entry. The controller sequentially plays all of the stored entries from all of the codes relevant to the selected city within the selected area code.

According to another embodiment of the invention, this system and method accommodates storage and retrieval of other services available to solicitors, in addition to available loads. For instance, someone who owns a tire repair service in a particular city or geographic area may wish to advertise his services to solicitors. By recording a services-available message for the area code/memory address which corresponds to the geographical region where the tire repair service is available, and by modifying the controller to enable solicitors to initially select a needed service, i.e., available-loads, food, lodging, road and tire repair services, hazardous assistance, etc. Information related to these other types of services may be made available to dispatchers and truck drivers on a continuous basis, via one simple telephone call. While this feature could involve initiation of message storage and removal by providers, as with available loads, it is preferable that an operator record the messages for services other than available-loads, due to the fact that these other services are less likely to change on a frequent basis.

According to a further embodiment of the invention, the available-load messages may be further stored and retrieved from memory according to both geographical destination and geographical location of origin. This further automates the collection and dissemination of available-load information via area code. According to this embodiment, each of the multiple memory addresses further includes multiple selectable memory slots, and each slot corresponds to a particular geographical destination for a load. The slots are accessible to both providers and solicitors via entry of a second area code into the controller, after entry of the first area code corresponding to geographical location of origin, as described previously.

Further automation of the system may involve the numbered coding of truck types, load weight, etc. According to this embodiment, the controller would store and recall messages according to a coded truck type so that solicitors would then only hear messages for the type of truck that they have available.

These and other features of the invention will be more readily understood in view of the following detailed description of the drawings in which:

DETAILED DESCRIPTION OF THE INVENTION

Figure 1:
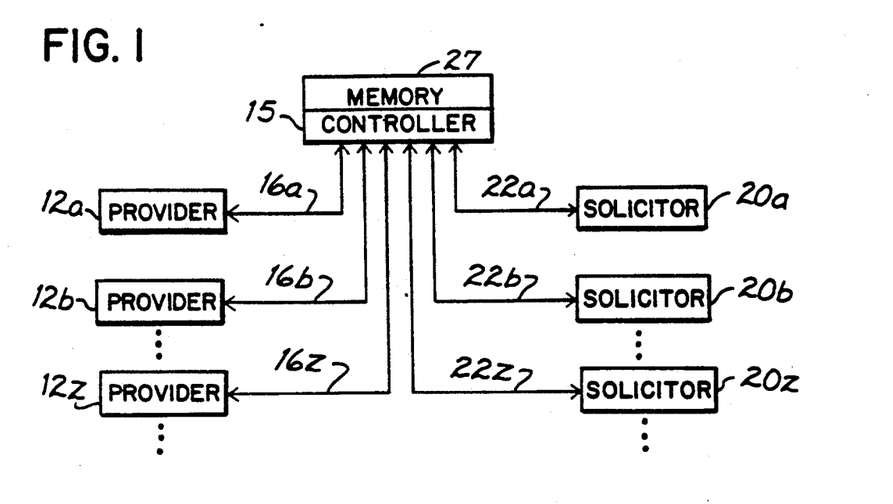
FIG. 1 schematically shows the interrelationship among providers, solicitors and a controller via the telephone system in accordance with a preferred embodiment of the invention.

FIG. 1 shows a schematic overview of a system 10 for collecting and disseminating available load information and other services information for the trucking industry. Numeral 12 represents one or more providers 12a, 12b . . . 12z who may communicate with a controller 15 over a conventional telephone line 16 via any touch tone telephone (not shown). The providers 12 call the controller 15 by dialing a provider-number. Numeral 20 represents a plurality of solicitors, designated 20a, 20b . . . 20z, who may communicate with the controller 15 over any conventional telephone line 22 via a touch tone telephone (not shown). These solicitors 20 may be trucking company dispatchers, truck drivers or anyone else in charge of obtaining a load or service for a truck. The solicitor 20 calls the controller by dialing a solicitor-number, which is different from the provider number.

Controller 15 has memory 27 for storing and recalling messages. In its simplest form, this invention contemplates a controller 15 which includes a programmable telephone answering machine with memory capacity for storing a plurality of messages from a large number of providers 12. The invention presently contemplates use of up to twenty four incoming telephone lines, though more could be used if necessary. While it is believed that hardware from any one of a number of telephone voice message system companies may be used to carry out this inventive method, applicant has found that equipment supplied by the Octel Communication Corporation to be particularly suitable. If desired, more complex systems may involve use of a computer. This would facilitate simultaneous processing of a plurality of incoming telephone calls and automatic categorization of available loads according to various criteria.

Providers 12a, 12b . . . 12z in possession of a valid password may interact with the controller 15 and the memory 27 attached thereto to record or erase available load messages. The controller 15 must recognize a validly input password from a provider 12a, 12b . . . 12z before access is provided for recording or erasing message contents into or from the portions of the memory that have been paid for by that provider. For providers, these portions of memory 27 are accessible via entry of purchased code numbers.

When the entered password has been recognized by the controller 15, the provider 12 enters a numerical code which represents preferably about one minute of purchased recording time. If desired, the provider 12 may purchase more than one code. Each code is keyed by the controller to an address in memory dedicated to a geographical area represented by a telephone area code. Preferably, each provider code is also keyed to a particular city within the area code/memory address. To locate memory 27 contents via a provider-entered code or a solicitor-entered three digit area code, the controller 15 includes a signal converter which converts the aural tones of the pushbuttons from a touch tone telephone into electrical signals recognizable by the controller 15 for searching through memory 27.

Solicitors 20 interact with the controller 15 by dialing a solicitor number and then entering the three digits for an area code where a load is needed. When three digits of the touch tone telephone are depressed, the signal converter converts the three audible tones into an electrical signal recognized by the controller 15. This signal controls interaction with that portion of the memory 27 dedicated to the selected area code. After keying into an area code, the solicitor may further key into a particular city within the area code by depressing another button. In response, the controller 15 locates all the provider codes dedicated to the selected city within the selected area code.

Figure 2:
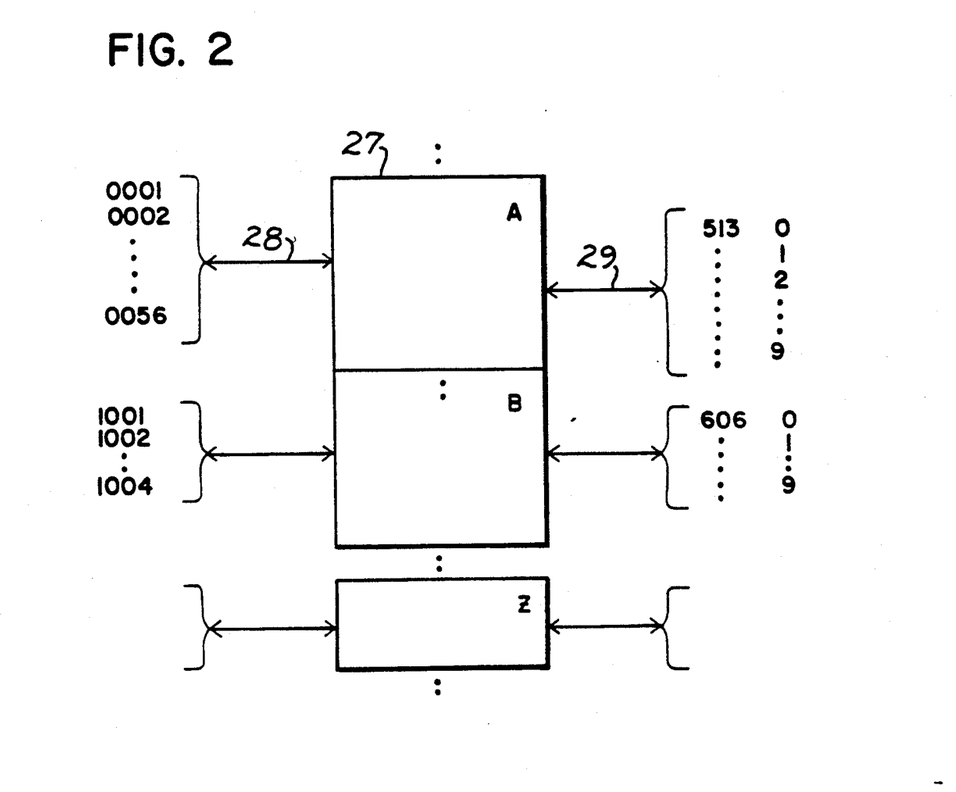
FIG. 2 is a schematic which depicts access into memory by providers and solicitors via entered codes and area codes, respectively.

FIG. 2 shows that provider 12 access to desired portions of memory 27 is via pre-purchased, entered provider codes dedicated to a particular city within a particular geographical area. Interaction between a provider 12 and memory 27 is indicated by directional arrow 28. On the other hand, solicitor 20 access to memory 27 is via three digit area codes representing geographical areas. Interaction between a solicitor 20 and memory 27 is indicated by directional arrow 29. FIG. 2 shows provider codes 0001, 0002 . . . 0056 and solicitor-entered area code 513 associated with block A. These provider codes are further organized according to city. For instance, 0001 and 0002 may relate to Cincinnati, which may correspond to entering a "0" after 513, while 0056 may relate to Dayton, which may correspond to entering a "1" after 513. Similarly, block B is dedicated to provider codes 1001, 1002 . . . etc., and area code 606. Thus, the provider 12 and the solicitor 20 interact with memory 27 from opposite "sides", or by inputting different controller-recognized signals.

It is to be understood that it is not absolutely necessary to tie each provider code to one specific area code. If the controller 15 is a computer with sufficient memory, all of the available loads from all the providers' codes could be scanned from memory when a solicitor calls. This alternative embodiment is discussed in more detail later in the specification.

Figure 3:
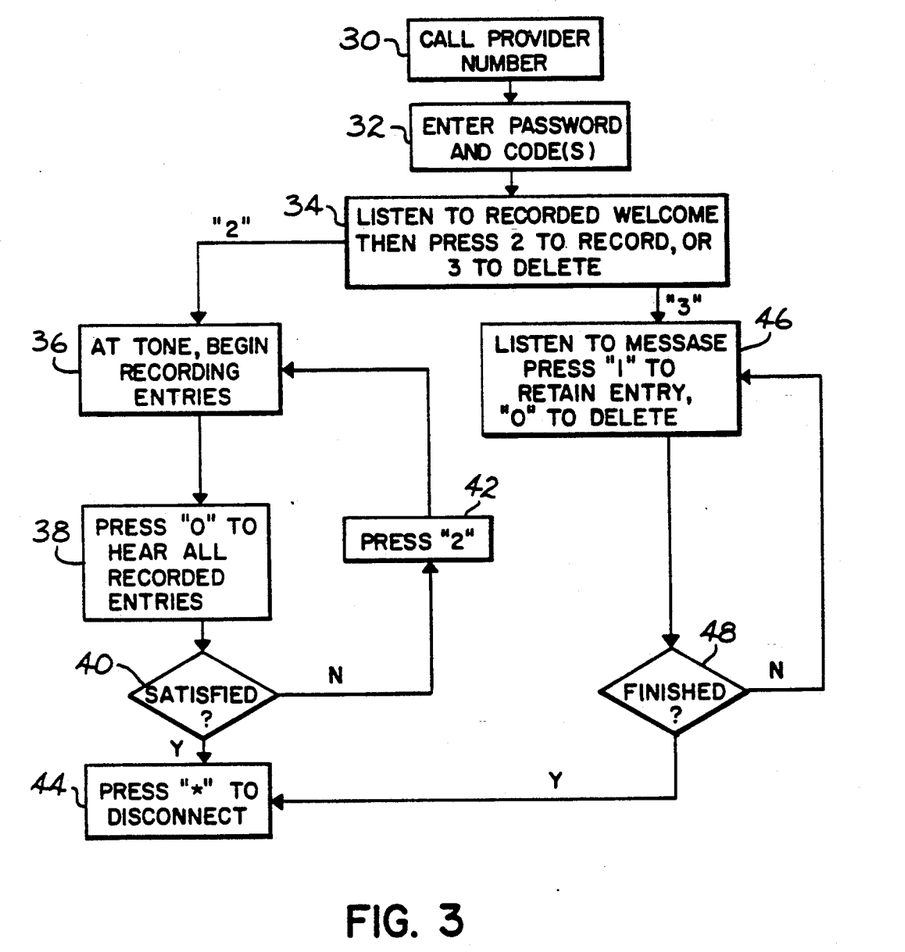
FIG. 3 is a flowchart which schematically depicts provider interaction with the controller in accordance with a preferred embodiment of the invention.

FIG. 3 is a flowchart which schematically depicts the sequence of events which occurs when a provider 12 interacts with the controller 15. Block 30 represents a telephone call from a provider 12 to the controller 15 to initiate interaction. As indicated previously, provider 12 must call a number which is different from those used by solicitors 20. After the call is answered, provider 12 enters an individualized password and code by depressing pushbuttons on the touch tone telephone. This is indicated by block 32.

If the password is recognized, controller 15 searches memory 27 to locate the portion dedicated to the entered provider code. Controller 15 then plays a prerecorded welcome which concludes by instructing the provider 12 to press "2" to record or to press "3" to delete, as shown in block 34.

If "2" is pressed, the controller 15 supplies an aural tone to indicate to the provider 12 to begin recording entries, as shown in block 36. During recording, the provider 12 describes each load as quickly and simply as possible. It is in the best interest of the provider 12 to include as many loads, or information entries within the minute of memory allocated to the entered code. However, it is also vitally important that provider 12 speak with sufficient clarity that each of the entries can be clearly understood when replayed from memory. The provider 12 should also enter a specified key to indicate the end of each message, thereby to assist in fast forwarding from one entry to another when selectively deleting entries which represent loads that are no longer available or fast forwarding during playback. Each information entry should include, a geographical destination for the load, a type of truck required to haul the load, particular equipment that may be necessary to transport the load, and any other additional information that may be pertinent such as the time deadline for picking up the load, and finally, a provider identity, preferably a telephone number. If the provider 12 is unable to record all of his available load within the allotted minute, it may be necessary to purchase additional codes to obtain additional space within the memory 27 of the controller 15.

After all of the information entries have been recorded by the provider 12 in the memory 27, the provider 12 may press "0" to hear a playback of the entries he has just recorded, as shown in block 38. If the provider 12 is not satisfied with one or more of the recorded messages, as shown in block 40, provider 12 presses "2", as shown by block 42, and then again records that one or more message. If all the recorded entries are adequate, provider 12 presses the pound key to disconnect the call, as shown by block 44.

If the provider 12 wishes to delete one or more entries, the "3" pushbutton is depressed in response to the instruction outlined in block 34. The controller 15 then begins to replay all of the entries stored within that portion of the memory set aside for the entered provider code. As shown in block 46, provider 12 listens to the replay, and presses "1" to retain an information entry or "0" to delete an information entry. After either one of these push-buttons is depressed, the controller 15 advances to the next stored entry. As shown in block 48, this procedure continues until the provider 12 has listened to at least some portion of all of the entries and either retained or deleted all of them. When the provider 12 is finished, he presses the pound key to disconnect the call.

Figure 4:
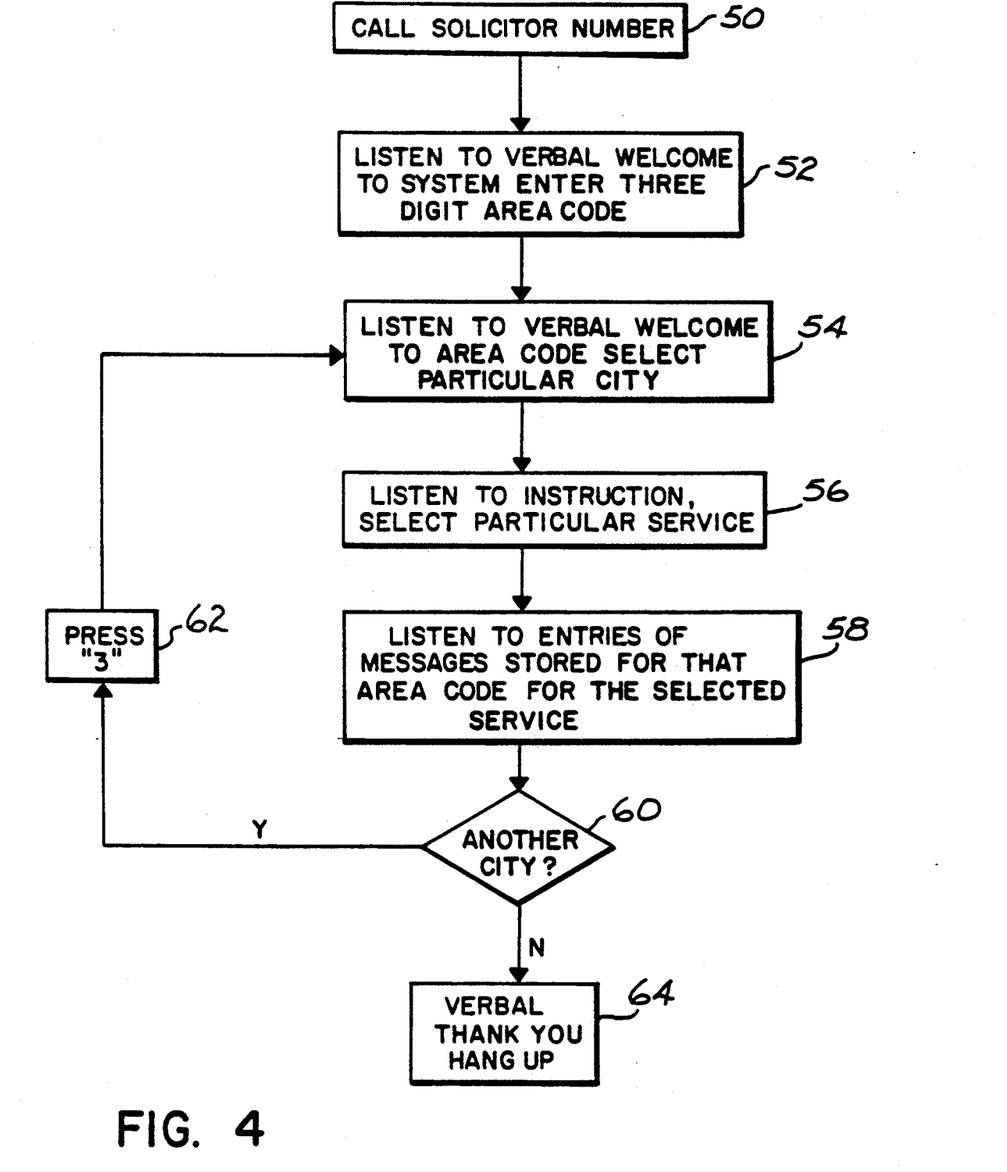
FIG. 4 is a flowchart which schematically depicts solicitor interaction with the controller in accordance with a preferred embodiment of the invention.

FIG. 4 is a flowchart which schematically depicts the interaction between a solicitor 20 and the controller 15. This interaction is initiated by the solicitor 20 by dialing a solicitor phone number to obtain access into the system 10. Dialing of the solicitor number is represented by block 50. After a predetermined number of rings, the controller 15 plays a prerecorded verbal welcome to the system 10, and then instructs the solicitor 20 to enter a three digit area code where a load and/or services are needed, as shown in block 52. The solicitor may override the message by immediately entering the three digit area code.

In response to receipt of the selected three digit area code, controller 15 plays a verbal welcome to the selected area code, and then instructs the solicitor to select a particular city within the area code by depressing another pushbutton, as shown in block 54. After the controller 15 has processed the signal representing a selected city, controller 15 is ready to play back to the solicitor 20 all of the messages from the provider codes relevant to the selected city.

According to one embodiment of the invention, the system 10 further contemplates the providing of information related to services such as repairs, food, fuel, emergency, etc. in addition to available loads. According to this embodiment, controller 15 instructs the solicitor 20 to select a particular service, as shown in block 56. The particular service is selected by depressing a pushbutton identified by the controller 15. As indicated previously, it is preferable that an operator at the controller 15 input and erase the information entries for all services other than available loads, due to the rather unchanging nature of these messages.

In response to the selected service, the controller 15 plays back messages from all of the codes stored within memory which are relevant to the selected area code, the selected city and the selected service. Block 58 represents the solicitor 20 listening to playback of all of these messages. When all of the messages have been played, the solicitor 20 is provided an opportunity to select another city within the selected area code. This choice is represented by block 60. If another city is desired, solicitor 20 depresses pushbutton "3", as shown by block 62, and then proceeds to select another city, another type of service and eventually listen to the pertinent messages. If the solicitor 20 does not wish to select another city, the controller 15 plays a verbal thank you and disconnects the system. This may occur automatically after a predetermined time delay or upon keying in a specified number.

Alternatively, according to another embodiment, both providers 12 and solicitors 20 may access the system 10 by calling the same telephone number. In this embodiment, purchased codes are not tied by the system 10 to a particular address in computer memory. Rather, providers 12 may store messages in any area code.

Figure 5:
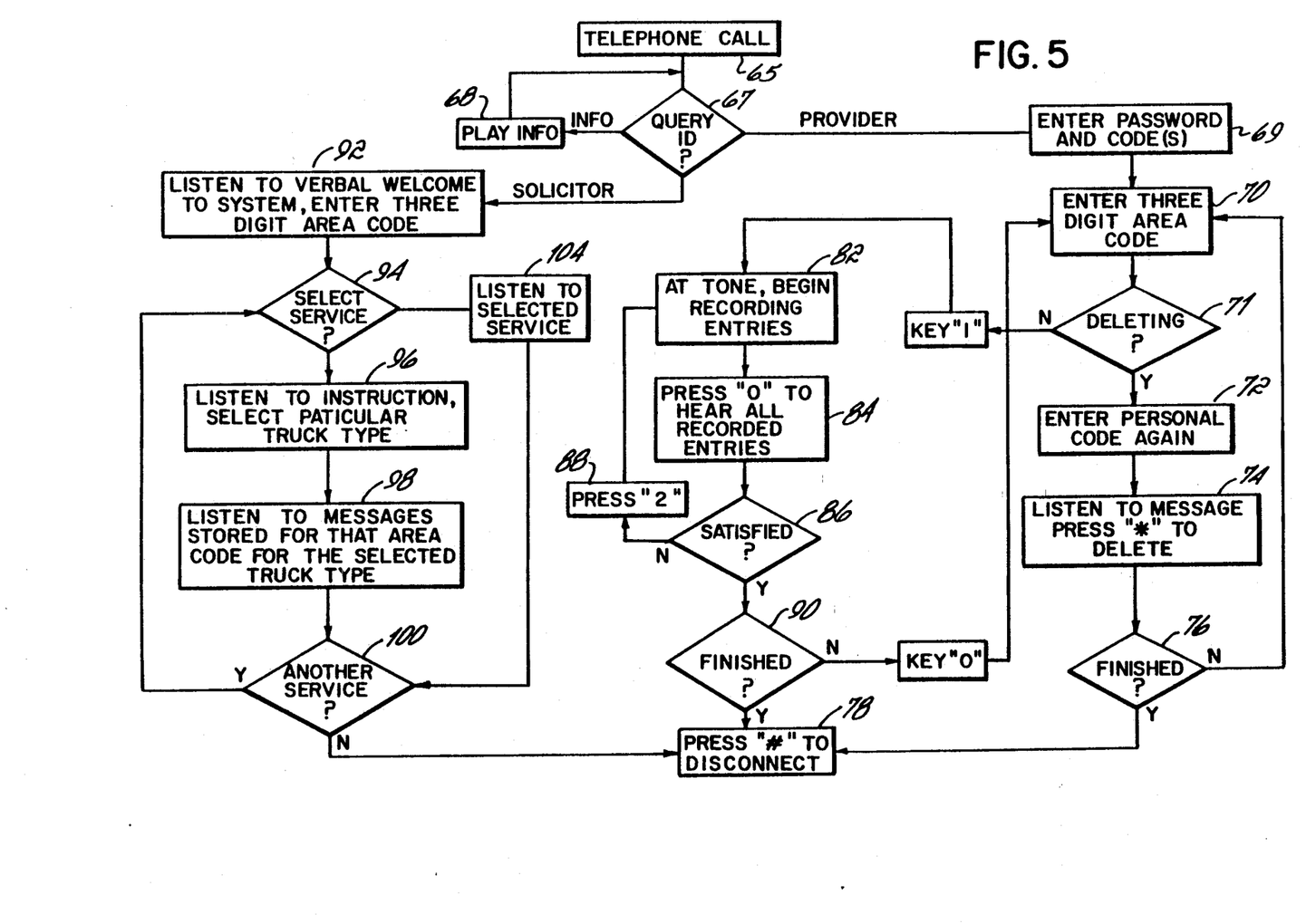
FIG. 5 is a flowchart depicting an alternative embodiment of the invention.

FIG. 5 schematically depicts this alternative method in sequential, flowchart form. Numeral 65 represents a telephone call to the controller 15. Block 67 represents a query transmitted by the controller 15 in response to receipt of the telephone call, after a predetermined number of rings. This query is a prerecorded question as to whether the caller is a provider, a solicitor or simply needs more information. The caller answers by depressing one of three pushbuttons, as instructed. Block 68 represents depression of the button corresponding to additional information. Block 69 represents keyed entry by the provider 12 of a password and code, followed by keyed entry of a three digit area code, as indicated by block 70. Block 71 indicates a query as to whether the provider 12 wants to delete or record. If "delete" is selected, the provider 12 keys in "2", and then keys in his or her personal code, as indicated by block 72. Block 74 represents listening to the recorded messages by the provider 12, with the provider able to delete a message by depressing the "*" key or fast forward to the next message by depressing the "1" key. Block 76 represents a query as to whether the provider 12 is finished. If the answer is affirmative, the provider enters "#" to disconnect, as indicated by block 78. If the answer is negative, the provider 12 enters another three digit area code, as shown by block 70.

If the response to the query represented by block 71 is negative, the provider 12 depresses key "1", as indicated by block 80. After a tone, provider 12 begins recording available load entries, as indicated by block 82. Prior to recording each entry, the provider 12 keys in a "1", "2", or "3" to designate trailer, "2" may represent closed trailer and "3" may represent either, where specificity as to trailer type is not critical. The end of each load is indicated by the provider 12 entering a specified key. This step facilitates subsequent location of the message and may also be used to cue the controller 15 to automatically supply an already recorded identification and telephone number, thereby saving time on the telephone. Upon completion of recording, provider 12 may key in "0" to listen to all of the recorded entries, as indicated by block 84. During playback, the provider 12 may also delete selected messages by depressing the "*" key. Block 86 represents a query as to whether or not provider 12 is satisfied with the recording. If the answer to this query is negative, the provider 12 keys "2", as indicated by block 88 to record the messages again. If the provider 12 is satisfied with the recorded entries, and he is finished, i.e., has no more loads for other area codes (block 90), he depresses "#" to disconnect, as shown by block 78. If the provider 12 wishes to delete or record in another area code, he keys in a "0", block 91, followed by another three digit area code, block 70.

If the caller identifies himself as a solicitor 20 in response to the query represented by block 67, he will hear a verbal welcome to the system 10, along with an instruction to enter a three digit area code, as shown in block 92. Thereafter, the solicitor will be instructed to select a service by depressing a key on the telephone, as indicated by block 94. If the solicitor 20 selects a service identified as available load information, he is then instructed to select a particular truck type, as shown by block 96. Subsequently, the solicitor 20 listens to messages stored for that area code for the selected truck type, as shown by block 98. When the messages are complete, the solicitor 20 may select another service or another truck type, as indicated by block 100. When no additional services are desired, the solicitor 20 keys the "#" key to disconnect the telephone call, as indicated by block 78.

If additional services are desired, solicitor 20 depresses the key associated with the next desired service, as shown by block 94. If the solicitor 20 selects a service other than available loads, as indicated by block 104, the selected service is played back, and then the solicitor again has the opportunity to select an additional service, as indicated by block 100. It is to be understood that block 104 schematically illustrates the logical routing of more than one additional, selectable service stored by the system 10. It does not imply that only one additional service is available.

This embodiment constitutes only one of the many variations of this invention. Variations to suit other desirable features fall within the scope of the invention. For instance, though not depicted, if the solicitor wishes to hear messages from another area code, that option may also be incorporated into the system so that this can be accomplished without having to disconnect and call again.

It is thought that this embodiment may reduce the number of telephone lines required for the system 10. Additional features of this embodiment and the previous embodiment may include: volume adjustment by the user during message replay and deletion of available-load messages that have been in the system after twenty-four hours.

According to a further embodiment of the invention, each memory address/area code set aside for a particular geographical location of load origin may be further broken down into slots which designate distinct geographic locations of load destination. Accordingly, when a phone call 30 is placed by either a provider or a solicitor, after keying in the push-buttons to select the geographical location of load origination, the caller then further selects an area code/memory slot within that particular address which has been designated for receipt of available load messages destined for that particular area code. The solicitor 20 then only hears about loads destined for his desired destination.

Ultimately, with use of a computer, the system 10 can be completely automated to store and recall messages according to one or more of the following pieces of information: geographical origination, geographical destination, type truck, necessary equipment, volume, weight, rate of pay, provider, etc. This may reduce total time on the telephone and thereby reduce the cost of interacting with the controller 15 via a long distance call. To best utilize the invention according to the embodiment, applicant believes that the controller 15 should be an IBM compatible computer equipped with an 80386 microprocessor with 33 MHz switching capability, 28 expansion slots to accommodate twenty eight telephone lines, 4 megabyte RAM, 64 k Cache memory and 212 megabyte hard drive. This equipment would facilitate quick and easy storage and retrieval of available work loads by codes corresponding to each of the above identified types of pertinent information.

While several preferred embodiments of the inventive method have been described, it is to be understood that the invention is not limited thereby and that in light of the present disclosure, various other alternative embodiments will be apparent to a person skilled in the art. For instance, the inventive method has been described with respect to a telephone call 30 from a pushbutton phone. However, the controller 15 may also be adapted to receive input signals from a dial phone. Accordingly, it is to be understood that changes may be made without departing from the scope of the invention as particularly set forth and claimed.

I claim:

1. A method for conveying available-load information within the trucking industry comprising the steps of:
   receiving from a plurality of providers messages related to available-loads to be shipped, each message including at least a voiced provider identification and accompanied by a geographical location of origination;
   storing each of said received messages at a controller according to an address which corresponds to a geographical location of origination for the respective available-load, the controller having a plurality of addresses and each said address adapted to store a plurality of received messages; and
   conveying to any one of a plurality of solicitors, from an address selected by said any one solicitor which is representative of a desired geographical location of origination, all of the messages previously stored in said selected address by the plurality of providers, including the voiced provider identifications associated therewith.

2. The method of claim 1 wherein each of said receiving and conveying steps is performed via communication between the controller and a touch tone telephone interconnected with a conventional telephone system.

3. The method of claim 1 wherein each received message includes a geographical destination and a provider identification, and said received messages are both stored in and conveyed from an address which represents a telephone area code corresponding to a geographical location of origin of the available-load.

4. The method of claim 3 and further comprising the step of:

removing from an address of the controller a received, stored message related to an available-load that is no longer available.

5. The method of claim 4 wherein the removing step is initiated by a provider via a touch tone telephone.

6. The method of claim 1 and further comprising the steps of:

receiving services-available messages at the controller;

storing each of the received services-available messages at the controller in an address which corresponds to a selected geographical location of availability; and conveying to a solicitor, from an address selected by the solicitor, the services-available messages previously stored therein.

7. The method of claim 2 wherein said conveying step further comprises:

bypassing portions of one or more stored messages in response to instructions initiated by said solicitor via a touch tone telephone.

8. The method of claim 1 wherein the controller stores and conveys messages according to a specific city within the respective geographical area serviced by an area code.

9. The method of claim 3 wherein each memory address is further divided into slots which correspond to geographical destinations, the method further comprising the steps of:

receiving and storing each of the provider initiated messages in an address which corresponds to a geographical location of origin and in a slot within the respective address which corresponds to a provider selected geographical destination; and conveying to a solicitor any provider identifications stored within a slot of an address selected by the solicitor, the solicitor selected memory address and slot corresponding to a desired geographical location of origin and a geographical destination, respectively.

10. A method for conveying available load information from providers to solicitors in the trucking industry comprising the steps of:

receiving from a plurality of providers message entries related to available loads to be shipped, each message entry including at least a voiced provider identification and a geographical destination and accompanied by a geographical location of origination;

storing each of said received message entries at a controller according to an address which represents a telephone area code corresponding to a geographical location of origin of the available load;

conveying to any one of a plurality of solicitors, from an address selected by said any one solicitor, all of the message entries stored therein, including the voiced provider identifications associated therewith; and removing, in response to instructions by providers, stored message entries related to available-loads that are no longer available.

* * * * *